United States Patent
Wang et al.

(10) Patent No.: US 9,274,407 B2
(45) Date of Patent: Mar. 1, 2016

(54) PHOSPHOR DEVICE AND ILLUMINATION SYSTEM AND PROJECTION APPARATUS WITH THE SAME

(71) Applicant: DELTA ELECTRONICS, INC., Taoyuan Hsien (TW)

(72) Inventors: Bor Wang, Taoyuan Hsien (TW); Keh-Su Chang, Taoyuan Hsien (TW); Chien-Hao Hua, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 0 days.

(21) Appl. No.: 14/478,579

(22) Filed: Sep. 5, 2014

(65) Prior Publication Data

US 2014/0375961 A1 Dec. 25, 2014

Related U.S. Application Data

(63) Continuation of application No. 13/617,201, filed on Sep. 14, 2012, now Pat. No. 9,024,241.

(60) Provisional application No. 61/537,687, filed on Sep. 22, 2011.

(51) Int. Cl.
| | |
|---|---|
| G03B 21/20 | (2006.01) |
| H04N 9/31 | (2006.01) |
| F21K 99/00 | (2010.01) |
| F21V 9/08 | (2006.01) |
| F21V 9/16 | (2006.01) |
| F21V 13/08 | (2006.01) |

(52) U.S. Cl.
CPC ............... *G03B 21/204* (2013.01); *F21K 9/56* (2013.01); *F21V 9/08* (2013.01); *F21V 9/16* (2013.01); *F21V 13/08* (2013.01); *H04N 9/3105* (2013.01); *H04N 9/3114* (2013.01); *H04N 9/3158* (2013.01); *H04N 9/3164* (2013.01)

(58) Field of Classification Search
CPC .. G03B 21/204; G03B 21/14; G03B 21/2013; F21V 9/16
USPC ............. 250/226, 216, 208.1; 353/75, 84, 85, 353/97, 31; 362/84, 227, 281, 293
See application file for complete search history.

(56) References Cited

U.S. PATENT DOCUMENTS

| | | | |
|---|---|---|---|
| 7,547,114 B2 | 6/2009 | Li et al. | |
| 7,651,243 B2 * | 1/2010 | McGuire, Jr. | ......... F21S 10/007 359/589 |
| 8,558,448 B2 | 10/2013 | Harada | |

(Continued)

FOREIGN PATENT DOCUMENTS

| | | |
|---|---|---|
| CN | 1837893 | 9/2006 |
| CN | 101995748 | 3/2011 |

(Continued)

*Primary Examiner* — Que T Le
(74) *Attorney, Agent, or Firm* — Kirton McConkie; Evan R. Witt

(57) ABSTRACT

A phosphor device of an illumination system is provided. The illumination system emits a first waveband light and has an optical path. The phosphor device includes a first section and a first phosphor agent. The first phosphor agent is coated on the first section. After the first waveband light is received by the first phosphor agent, the first waveband light is converted into a third waveband light, and the third waveband light is directed to the optical path, so that the third waveband light is separated into at least two color lights along the optical path.

20 Claims, 11 Drawing Sheets

(56) References Cited

U.S. PATENT DOCUMENTS

| | | |
|---|---|---|
| 8,562,141 B2 | 10/2013 | Ogino |
| 8,662,678 B2 | 3/2014 | Hirata et al. |
| 8,733,940 B2 | 5/2014 | Tanaka et al. |
| 2005/0270775 A1 | 12/2005 | Harbers et al. |
| 2009/0034284 A1 | 2/2009 | Li et al. |
| 2009/0051884 A1 | 2/2009 | Kuan et al. |
| 2010/0220298 A1 | 9/2010 | Wang et al. |
| 2010/0314650 A1 | 12/2010 | Sugimori |
| 2010/0315320 A1 | 12/2010 | Yoshida |
| 2010/0328626 A1 | 12/2010 | Miyazaki |
| 2011/0043761 A1 | 2/2011 | Miyamae |
| 2011/0063581 A1 | 3/2011 | Iwanaga |
| 2011/0149549 A1 | 6/2011 | Miyake |
| 2011/0188010 A1 | 8/2011 | Lin et al. |
| 2011/0199580 A1 | 8/2011 | Hirata et al. |
| 2011/0205502 A1 | 8/2011 | Kato et al. |
| 2011/0228232 A1 | 9/2011 | Sakata et al. |
| 2011/0261326 A1 | 10/2011 | Wang et al. |
| 2011/0310353 A1 | 12/2011 | Maeda |
| 2011/0310362 A1 | 12/2011 | Komatsu |
| 2013/0050654 A1 | 2/2013 | Hu et al. |
| 2014/0146293 A1 | 5/2014 | Hirata et al. |

FOREIGN PATENT DOCUMENTS

| | | |
|---|---|---|
| CN | 102073115 | 5/2011 |
| CN | 102155639 | 8/2011 |
| CN | 202109406 U | 1/2012 |
| CN | 102650811 | 8/2012 |
| EP | 2355524 | 8/2011 |
| EP | 2360523 | 8/2011 |
| EP | 2749943 | 7/2014 |
| JP | 2003295319 | 10/2003 |
| JP | 2004325874 | 11/2004 |
| JP | 2007156270 | 6/2007 |
| JP | 2009245712 | 10/2009 |
| JP | 2009277516 | 11/2009 |
| JP | 2011100163 | 5/2011 |
| JP | 2011165555 | 8/2011 |
| JP | 2011175000 | 9/2011 |
| JP | 2011197212 | 10/2011 |
| JP | 2012137744 | 7/2012 |
| JP | 2012203366 | 10/2012 |
| WO | 2013029463 | 3/2013 |

\* cited by examiner

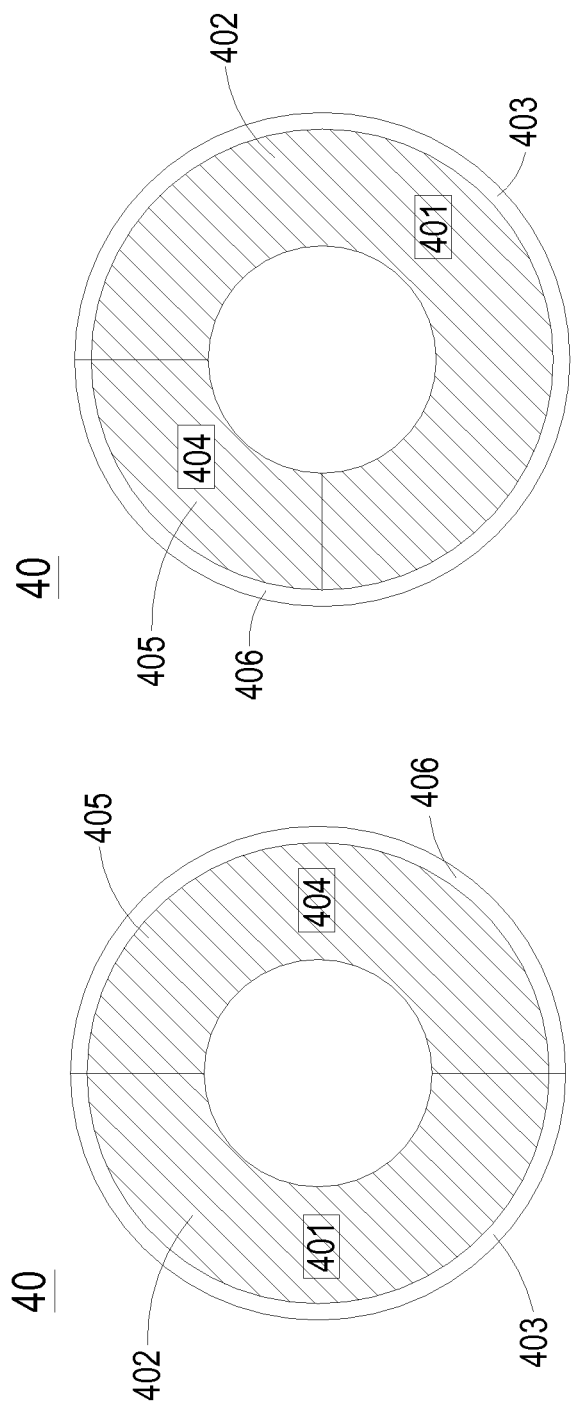

PHOSPHOR DEVICE AND ILLUMINATION SYSTEM AND PROJECTION APPARATUS WITH THE SAME

CROSS-REFERENCE TO RELATED APPLICATION

This application is a Continuation Application of U.S. patent application Ser. No. 13/617,201 filed on Sep. 14, 2012, and entitled "PHOSPHOR DEVICE AND ILLUMINATION SYSTEM AND PROJECTION APPARATUS WITH THE SAME", which claims the benefit of U.S. Provisional Application No. 61/537,687 filed on Sep. 22, 2011, and entitled "HYBRID SOLID STATE ILLUMINATION IN PROJECTORS", the entirety of which is hereby incorporated by reference.

FIELD OF THE INVENTION

The present invention relates to a phosphor device, and more particularly to a phosphor device containing a single phosphor agent. The present invention also relates to an illumination system and a projection apparatus with the phosphor device in order to produce three primary color lights.

BACKGROUND OF THE INVENTION

In recent years, a variety of projectors have been widely used in various video applications. For example, projectors can be used for making presentations, holding meetings or giving lectures in classrooms, boardrooms, conference rooms or home theaters. By the projector, an image signal from an image signal source can be enlarged and shown on a display screen. For reducing power consumption and overall volume, the illumination system of the current projector employs a solid-state light-emitting element (e.g. light emitting diode or laser diode) to replace the conventional high intensity discharge (HID) lamp.

Generally, the illumination system of the projector may emit three primary color lights, i.e. a red light (R), a green light (G) and a blue light (B). Among three primary color solid-state light-emitting elements including a red solid-state light-emitting element, a green solid-state light-emitting element and a blue solid-state light-emitting element, the blue solid-state light-emitting element has the highest luminous efficiency. Since the red solid-state light-emitting element and the green solid-state light-emitting element have poor luminous efficiency, the red light or the green light may be produced by using a blue solid-state light-emitting element and a wavelength conversion device (e.g. a phosphor wheel). That is, the uses of the blue solid-state light-emitting element and the phosphor wheel may directly emit the red light or the green light in replace of the red solid-state light-emitting element or the green solid-state light-emitting element. Consequently, the luminous efficiency of the whole illumination system is enhanced and the manufacturing cost of the illumination system is reduced.

Generally, the conventional illumination systems of the projectors are classified into two types. A conventional illumination system utilizes a single blue solid-state light-emitting element and a single phosphor wheel with plural sections. FIG. 1A schematically illustrates the architecture of a conventional projector. FIG. 1B schematically illustrates a phosphor wheel used in the illumination system of the projector as shown in FIG. 1A. As shown in FIGS. 1A and 1B, the illumination system of the projector 1 employs a solid-state light-emitting element 11 to emit a blue light to a phosphor wheel 12 with a first section 121, a second section 122 and a third section 123. The first section 121 is coated with a green phosphor agent. By the green phosphor agent, the incident blue light is converted to a green light. The second section 122 is coated with a red phosphor agent. By the red phosphor agent, the incident blue light is converted to a red light. The third section 123 is a transparent section. The blue light is transmitted through the third section 123. In other words, the blue light from the solid-state light-emitting element 11 is directly transmitted through the phosphor wheel 12 or converted into the green light or the red light by the phosphor wheel 12. Consequently, three primary color lights can be produced. Moreover, the three primary color lights are directed to an imaging device 14 through a relay module 13. For example, the imaging device 14 is a digital micromirror device (DMD), a liquid crystal display (LCD) device or a liquid crystal on silicon (LCOS) device. After being scaled up/down and focused by a lens group 15, an image is projected on a display screen 16.

Another conventional illumination system utilizes three blue solid-state light-emitting elements and two phosphor wheels, wherein each of the two phosphor wheels is coated with a single color phosphor agent. FIG. 2A schematically illustrates the architecture of another conventional projector. FIG. 2B schematically illustrates a first phosphor wheel used in the illumination system of the projector as shown in FIG. 2A. FIG. 2C schematically illustrates a second phosphor wheel used in the illumination system of the projector as shown in FIG. 2A. Please refer to FIGS. 2A, 2B and 2C. In the conventional illumination system of the projector 2, a section 221 of a first phosphor wheel 22 is coated with a red phosphor agent, and a section 241 of a second phosphor wheel 24 is coated with a green phosphor agent. By the red phosphor agent, the incident blue light is converted to a red light. By the green phosphor agent, the incident blue light is converted to a green light.

The projector 2 further comprises a first dichroic mirror 210 and a second dichroic mirror 211, a first solid-state light-emitting element 21, a second solid-state light-emitting element 23, and a third solid-state light-emitting element 25. The red light is permitted to be transmitted through the first dichroic mirror 210, but the green light is reflected by the first dichroic mirror 210. The red light and the green light are permitted to be transmitted through the second dichroic mirror 211, but the blue light is reflected by the second dichroic mirror 211. The blue light from the first solid-state light-emitting element 21 is converted to a red light by the first phosphor wheel 22. The red light is transmitted through the first dichroic mirror 210 and the second dichroic mirror 211 and directed to a relay module 26. The blue light from the second solid-state light-emitting element 23 is converted to a green light by the second phosphor wheel 24. The green light is sequentially reflected by the first dichroic mirror 210, transmitted through the second dichroic mirror 211 and directed to the relay module 26. The blue light from the third solid-state light-emitting element 25 is reflected by the second dichroic mirror 211 and directed to the relay module 26. Moreover, the three primary color lights are sequentially or simultaneously directed to an imaging device 27 through the relay module 26. After being scaled up/down and focused by a lens group 28, an image is projected on a display screen 29.

From the above discussions, the uses of the blue solid-state light-emitting element and the phosphor wheel may directly emit the red light or the green light in replace of the red solid-state light-emitting element or the green solid-state light-emitting element. However, since the green light converted by the green phosphor agent contains a portion of a red light, the green light looks somewhat yellowish. That is, the color purity is insufficient, and thus the imaging quality is impaired. Moreover, the exciting efficiency of red phosphor is lower and easier saturated than the green phosphor, the total amount of red light converted from the red phosphor agent is insufficient. As the driving current of the blue solid-state light-emitting element increases, the red light converted by the red phosphor agent quickly saturates or even decay. Under this circumstance, the luminance and brightness of the red light is too low, and the bright/dark status of the illumination system fails to be effectively controlled. Consequently, the overall amount of the output light is limited.

Therefore, there is a need of providing an improved illumination system and an improved projection apparatus in order to eliminate the above drawbacks.

SUMMARY OF THE INVENTION

It is an object of the present invention to provide an illumination system and a projection apparatus for obviating the drawbacks of high fabricating cost, complex fabricating process, large product volume, low luminance and brightness, insufficient color purity and impaired imaging quality encountered from a conventional illumination system of the projector.

The present invention provides an illumination system and a projection apparatus with a single phosphor device in order to reduce the fabricating cost, simplify the fabricating process, reduce the overall product volume, increase the overall luminance, increase the color purity and enhance the imaging quality.

The present invention also provides an illumination system and a projection apparatus with a single phosphor device. By the phosphor device, a first waveband light is converted into a third waveband light with a wider waveband. As the driving current of the blue solid-state light-emitting element increases, the possibility of attenuating the red light will be reduced. Consequently, the overall luminance and brightness will be increased, and the color performance is enhanced.

In accordance with an aspect of the present invention, there is provided a phosphor device of an illumination system. The illumination system emits a first waveband light and has an optical path. The phosphor device includes a first section and a first phosphor agent. The first phosphor agent is coated on the first section. After the first waveband light is received by the first phosphor agent, the first waveband light is converted into a third waveband light, and the third waveband light is directed to the optical path, so that the third waveband light is separated into at least two color lights along the optical path.

In accordance with another aspect of the present invention, there is provided an illumination system. The illumination system includes a phosphor device and a first solid-state light-emitting element. The phosphor device includes a first section and a first phosphor agent coated on the first section. The first solid-state light-emitting element is used for emitting a first waveband light to the phosphor device. The first waveband light is converted into a third waveband light by the phosphor device, and the third waveband light is directed to an optical path and separated into at least two color lights along the optical path.

In accordance with a further aspect of the present invention, there is provided a projection apparatus. The projection apparatus includes an illumination system and an image processing device. The illumination system includes a phosphor device, a first solid-state light-emitting element, and a second solid-state light-emitting element. The phosphor device includes a first section and a first phosphor agent coated on the first section. The first solid-state light-emitting element is used for emitting a first waveband light to the phosphor device. The first waveband light is converted into a third waveband light by the phosphor device, and the third waveband light is directed to an optical path. The second solid-state light-emitting element is used for emitting a second waveband light to the optical path. The image processing device is arranged along the optical path for receiving the third waveband light and the second waveband light. The third waveband light is separated into at least two color lights by the image processing device, so that the at least two color lights and the second waveband light are projected as an image in a color separation or time division manner.

The above contents of the present invention will become more readily apparent to those ordinarily skilled in the art after reviewing the following detailed description and accompanying drawings, in which:

BRIEF DESCRIPTION OF THE DRAWINGS

FIG. 6B is another exemplary phosphor device used in the projection apparatus of FIG. 5A or FIG. 5B;

FIG. 6C is a further exemplary phosphor device used in the projection apparatus of FIG. 5A or FIG. 5B;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1B:
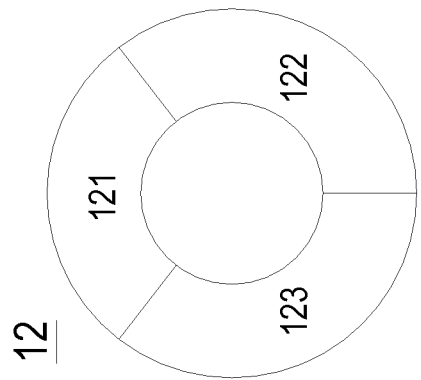
FIG. 1B schematically illustrates a phosphor wheel used in the illumination system of the projector as shown in FIG. 1A.
Figure 1A:
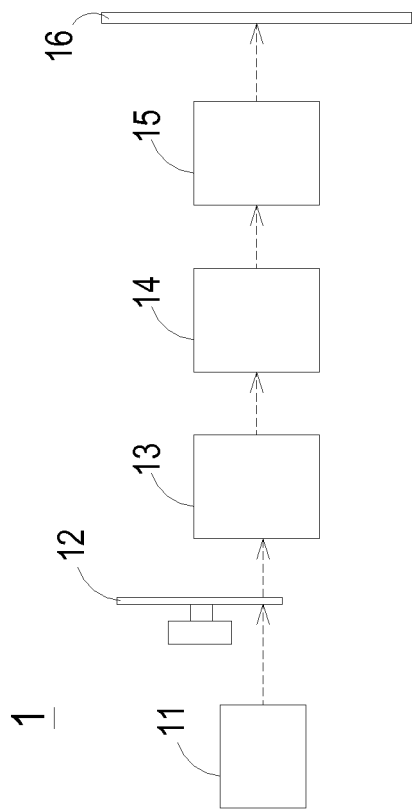
FIG. 1A schematically illustrates the architecture of a conventional projector.
Figure 2A:
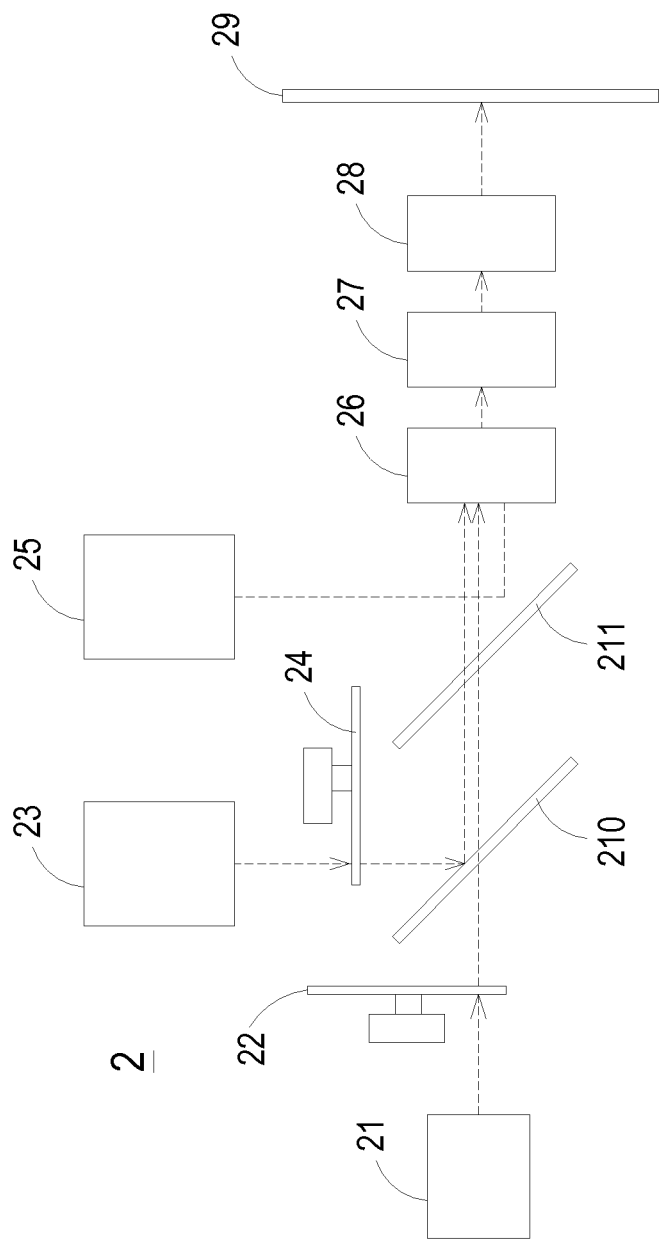
FIG. 2A schematically illustrates the architecture of another conventional illumination system of a projector.
Figure 2B:
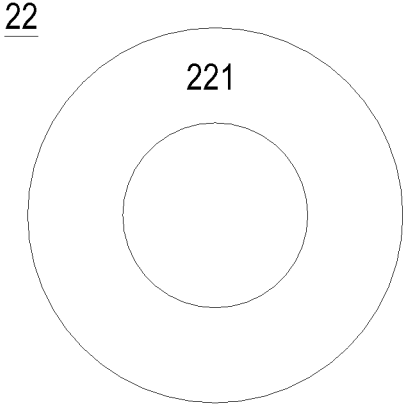
FIG. 2B schematically illustrates a first phosphor wheel used in the conventional illumination system as shown in FIG. 2A.
Figure 2C:
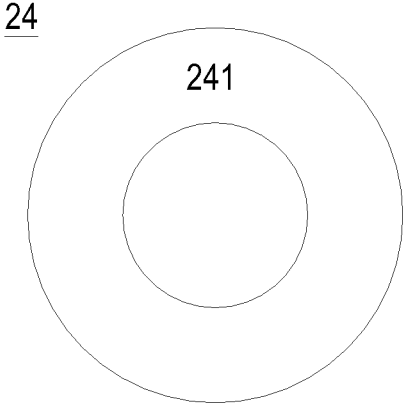
FIG. 2C schematically illustrates a second phosphor wheel used in the conventional illumination system as shown in FIG. 2A.
Figure 3:
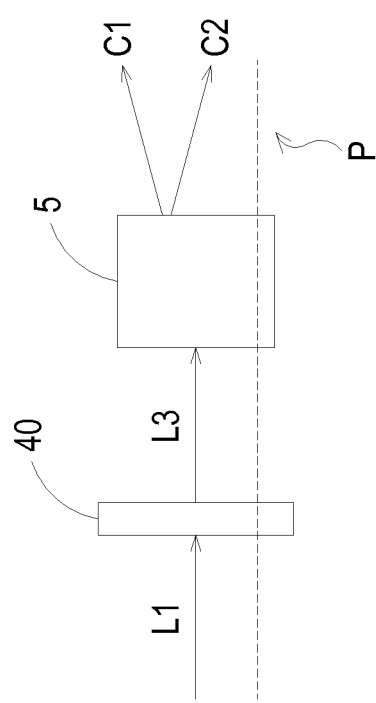
FIG. 3 schematically illustrates the concept of a projection apparatus with a phosphor device according to an embodiment of the present invention.

FIG. 3 schematically illustrates the concept of a projection apparatus with a phosphor device according to an embodiment of the present invention. As shown in FIG. 3, the phosphor device 40 is used in an illuminating system that emits a first waveband light L1 and has an optical path P. The phosphor device 40 comprises a first section 401 and a first phosphor agent 402 (see FIG. 6A). The first section 401 is coated with the first phosphor agent 402. After the first waveband light L1 from the illuminating system is received by the first phosphor agent 402, the first waveband light L1 is converted into a third waveband light L3, and the third waveband light L3 is directed to an image processing device 5 along the optical path P. By the image processing device 5, a color separation process is performed to separate the third waveband light L3 into a first color light C1 and a second color light C2.

Figure 4B:
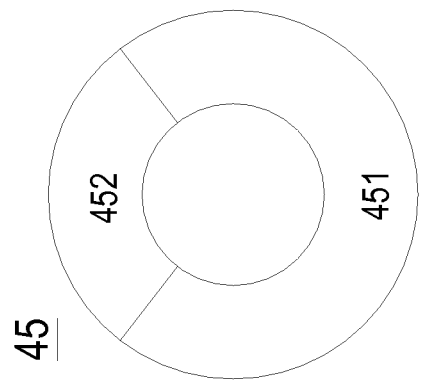
FIG. 4B schematically illustrates the structure of the phosphor device of FIG. 4A.
Figure 4A:
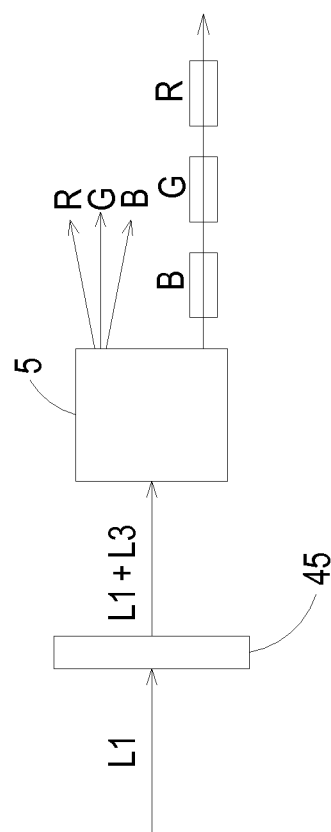
FIG. 4A schematically illustrates the concept of a projection apparatus with a phosphor device according to another embodiment of the present invention.

FIG. 4A schematically illustrates the concept of a projection apparatus with a phosphor device according to another embodiment of the present invention. FIG. 4B schematically illustrates the structure of the phosphor device of FIG. 4A. Please refer to FIGS. 3, 4A and 4B. The phosphor device 45 comprises a first section 451 and a transparent section 452. The central angle of the transparent section 452 is smaller than the central angle of the first section 451. In addition, the first section 451 is coated with a first phosphor agent. For clarification, the first phosphor agent is not shown in the drawings. A portion of the first waveband light L1 from the illuminating system is partially transmitted through the transparent section 452 of the phosphor device 45 and directed to an image processing device 5 along the optical path. Another portion of the first waveband light L1 is received by the first phosphor agent of the phosphor device 45, and converted into a third waveband light L3. The third waveband light L3 is also directed to the image processing device 5 along the optical path. By the image processing device 5, a color separation process is performed to separate the first waveband light L1 and the third waveband light L3 into at least two color lights. The at least two color lights and the first waveband light L1 constitute three primary color lights. For example, if the first waveband light L1 is a blue light, the at least two color lights comprise a red light and a green light. That is, the first waveband light L1 and the third waveband light L3 from the phosphor device 45 comprise the fractions of three primary color lights, which may be equivalent to a white light. By the image processing device 5, the first waveband light L1 and the third waveband light L3 are subject to color separation or time division, and thus the three primary color lights are projected in a color separation or time division manner.

In some embodiments, the first waveband light L1 is a blue light, and the third waveband light L3 is a yellow light, a green light or a yellow-green light. The first phosphor agent on the first section 451 of the phosphor device 45 is a green phosphor agent, a yellow phosphor agent or a yellow-green phosphor agent. Consequently, the first waveband light L1 (i.e. the blue light) and the third waveband light L3 (i.e. the yellow light, the green light or the yellow-green light) are directed from the phosphor device 45 to the image processing device 5. Since the third waveband light L3 (i.e. the yellow light, the green light or the yellow-green light) covers the waveband of the green light and the red light, after the color separation process is performed on the third waveband light L3, the third waveband light L3 is separated into a green light G and a red light R. Consequently, the green light G the red light R and the first waveband light L1 (i.e. the blue light) may be projected in the color separation or time division manner.

Figure 5A:
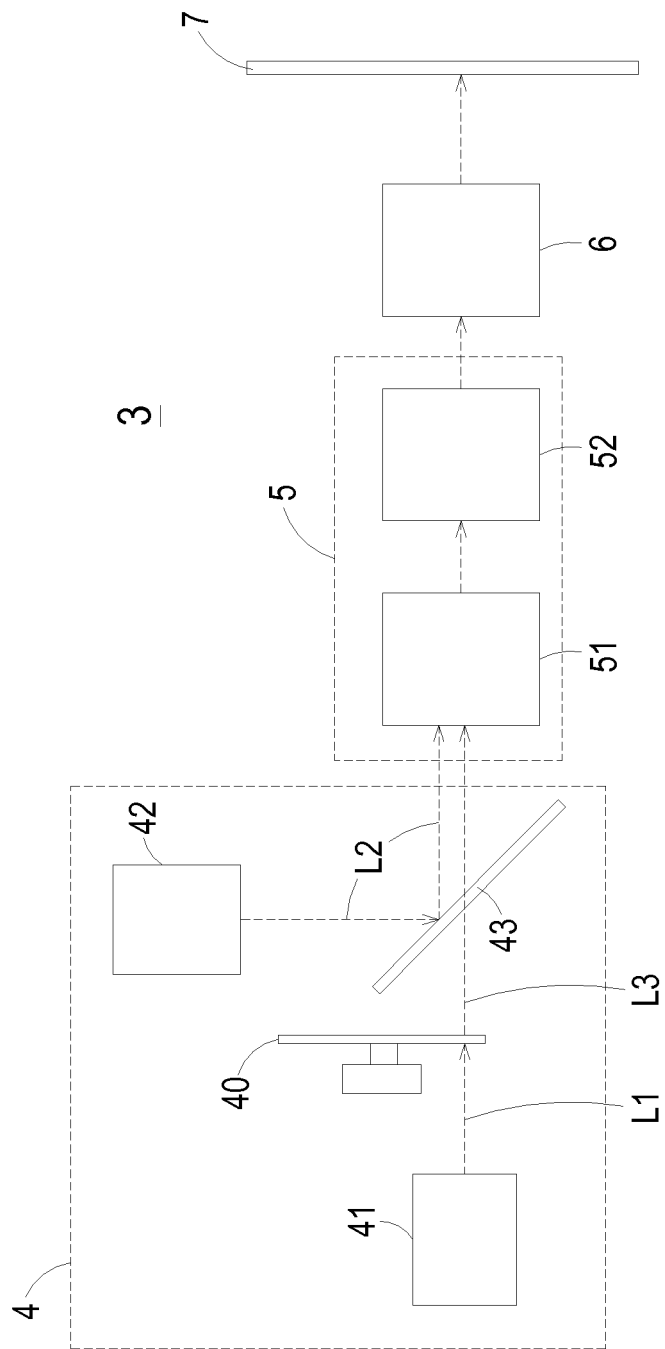
FIG. 5A schematically illustrates a projection apparatus according to an embodiment of the present invention.
Figure 5B:
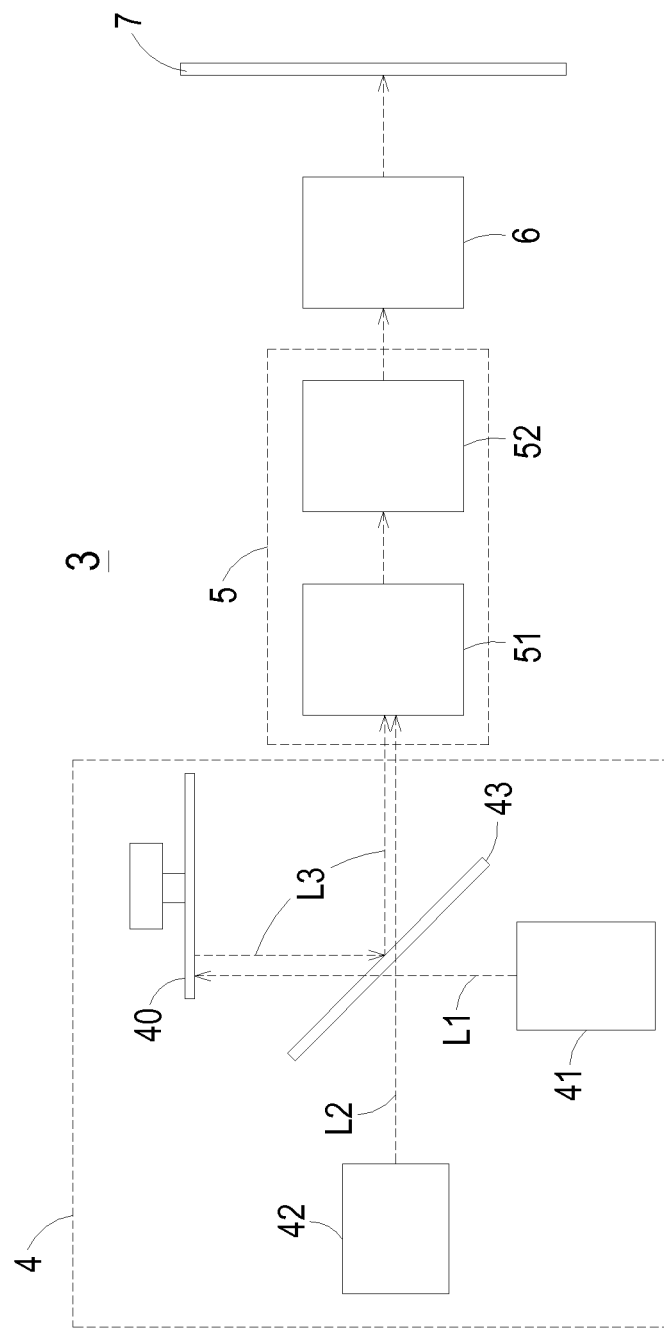
FIG. 5B schematically illustrates a projection apparatus according to another embodiment of the present invention.
Figure 6A:
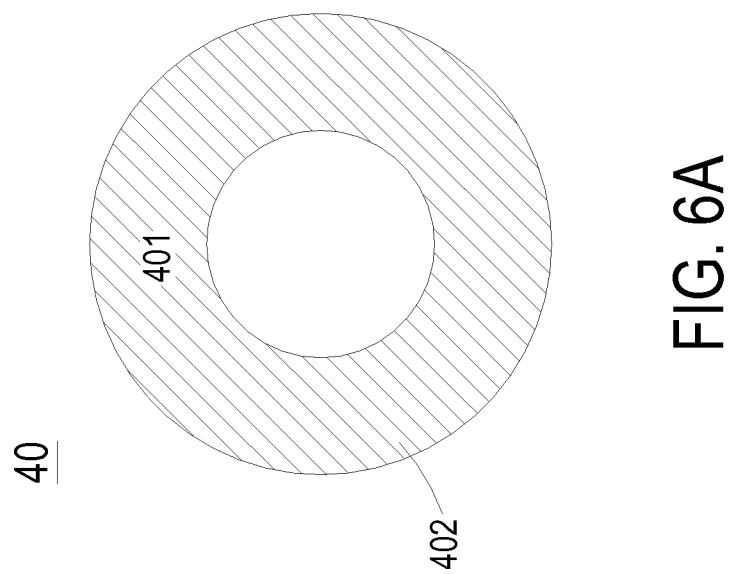
FIG. 6A is a phosphor device used in the projection apparatus of FIG. 5A or FIG. 5B.

FIG. 5A schematically illustrates a projection apparatus according to an embodiment of the present invention. FIG. 5B schematically illustrates a projection apparatus according to another embodiment of the present invention. FIG. 6A is a phosphor device used in the projection apparatus of FIG. 5A or FIG. 5B. Please refer to FIGS. 5A, 5B and 6A. The projection apparatus 3 comprises an illuminating system 4, an image processing device 5, and a lens group 6. The illuminating system 4 comprises a phosphor device 40, a first solid-state light-emitting element 41, and a second solid-state light-emitting element 42. The image processing device 5 and the lens group 6 are arranged along an optical path. Moreover, the image processing device 5 comprises at least one color-separating element, and the lens group 6 comprises at least one lens. The image processing device 5 comprises a relay module 51 and an imaging module 52. Along the optical path, the relay module 51 is located upstream of the imaging module 52. After being scaled up/down and focused by the lens group 6, an image is projected on a display screen 7. Moreover, according to the practical requirements of the optical path, the relay module 51 may include a relay lens, a homogenizer or a reflective mirror (not shown).

An example of the phosphor device 40 includes but is not limited to a phosphor wheel or a phosphor plate. The phosphor device 40 has a first section 401 containing a first phosphor agent 402. The first phosphor agent 402 is coated on the first section 401. For example, the first phosphor agent 402 is a green phosphor agent, a yellow phosphor agent or a yellow-green phosphor agent. The first solid-state light-emitting element 41 is used for emitting a first waveband light L1 to the phosphor device 40. The second solid-state light-emitting element 42 is used for emitting a second waveband light L2 to the optical path. In an embodiment, the first solid-state light-emitting element 41 and the second solid-state light-emitting element 42 are blue solid-state light-emitting elements or blue laser diodes for emitting the blue light (e.g. the first waveband light L1). That is, the first waveband light L1 is a light within the spectrum of a blue waveband. In some embodiments, the first waveband light L1 is a UV light. The first waveband light L1 and the second waveband light L2 are lights within the same waveband or different wavebands. By the phosphor device 40, the first waveband light L1 from the first solid-state light-emitting element 41 is converted into a third waveband light L3. The third waveband light L3 is a yellow-green light which covers a green waveband and a red waveband. In a case that the first phosphor agent is a green phosphor agent, the third waveband light L3 is a green light within a waveband between 450 nm and 710 nm. In the practical applications, the light within the waveband between 450 nm and 710 nm and the blue light (L2) are used in the rear-ended optical path to produce the three primary color lights.

From the above discussions, the first waveband light L1 within the blue waveband is converted into the third waveband light L3, which is a yellow-green light which covers a green waveband and a red waveband. The third waveband light L3 is directed to the optical path. A color separation process is performed to separate the third waveband light L3 into at least two color lights by the image processing device 5. Consequently, the at least two color lights and the second waveband light L2 are projected as an image in a color separation or time division manner. In other words, the phosphor device 40 issues the third waveband light L3 to the optical path. After the second waveband light L2 and the third waveband light L3 are received by the image processing device 5, the third waveband light L3 is separated into at least two color lights. Consequently, the primary color lights included in the second waveband light L2 and the third waveband light L3 are projected as an image in a color separation or time division manner. Since the illuminating system 4 only includes a single phosphor device 40, the overall volume of the illuminating system 4 or the projection apparatus 3 is reduced, the fabricating process is simplified, and the fabricating cost is reduced. Moreover, by using the illuminating system 4, the color purity and the imaging quality are enhanced. Moreover, since the first waveband light L1 is converted into the third waveband light L3 with a wider waveband. As the driving current of the blue solid-state light-emitting element increases, the possibility of attenuating the red light will be reduced. Consequently, the overall luminance and brightness of the projection apparatus 3 will be increased, and the color performance is enhanced.

Please refer to FIGS. 5A and 5B again. The illuminating system 4 further comprises a dichroic element 43 (e.g. a dichroic mirror). The dichroic element 43 is arranged at the front-ended optical path for assisting in introducing the third waveband light L3 and the second waveband light L2 into the optical path. In such way, the phosphor device 40, the first solid-state light-emitting element 41 and the second solid-state light-emitting element 42 may be applied to a transmissive illumination system or a reflective illumination system.

The illumination system as shown in FIG. 5A is a transmissive illumination system. In this embodiment, the third waveband light L3 is permitted to be transmitted through the dichroic element 43, but the second waveband light L2 is reflected by the dichroic element 43. The phosphor device 40 and the first solid-state light-emitting element 41 are located at a first side of the dichroic element 43. In addition, the phosphor device 40 is located along the optical path, and arranged between the first solid-state light-emitting element 41 and the dichroic element 43. By the phosphor device 40, the first waveband light L1 from the first solid-state light-emitting element 41 is converted into the third waveband light L3. The third waveband light L3 is transmitted through the dichroic element 43 and directed to the image processing device 5 and the lens group 6 at the rear end of the optical path. Under this circumstance, the incident direction of the first waveband light L1 is identical to the emergence direction of the third waveband light L3. The second solid-state light-emitting element 42 is located at a second side of the dichroic element 43. The second solid-state light-emitting element 42 is used for emitting the second waveband light L2 to the dichroic element 43. The second waveband light L2 is reflected by the dichroic element 43 and directed to the image processing device 5 and the lens group 6 at the rear end of the optical path. It is noted that numerous modifications and alterations may be made while retaining the teachings of the invention. For example, the dichroic element 43 may be designed to allow the second waveband light L2 to be transmitted through but reflect the third waveband light L3. Under this circumstance, the second waveband light L2 and the third waveband light L3 are also directed to the image processing device 5 and the lens group 6 at the rear end of the optical path.

The illumination system as shown in FIG. 5B is a reflective illumination system. In this embodiment, the second waveband light L2 is permitted to be transmitted through the dichroic element 43, but the third waveband light L3 is reflected by the dichroic element 43. The first solid-state light-emitting element 41 and the second solid-state light-emitting element 42 are both located at a first side of the dichroic element 43. The phosphor device 40 is located at a second side of the dichroic element 43. The first waveband light L1 from the first solid-state light-emitting element 41 is directly transmitted through the dichroic element 43 and directed to the phosphor device 40. The second waveband light L2 from the second solid-state light-emitting element 42 is transmitted through the dichroic element 43 and directed to the image processing device 5 and the lens group 6 at the rear end of the optical path. Moreover, after the first waveband light L1 from the first solid-state light-emitting element 41 is received by the phosphor device 40, the first waveband light L1 is converted into the third waveband light L3. The third waveband light L3 is directed to the dichroic element 43 in a direction reverse to the first waveband light L1. In other words, the incident direction of the first waveband light L1 is reverse to the emergence direction of the third waveband light L3 with respect to the phosphor device 40. Then, the third waveband light L3 is reflected by the dichroic element 43 and directed to the image processing device 5 and the lens group 6 at the rear end of the optical path.

From the above discussions, the first waveband light L1 is converted into a third waveband light L3. In a case that the first phosphor agent is a green phosphor agent, a yellow phosphor agent or a yellow-green phosphor agent, the third waveband light L3 is a yellow-green light within a waveband between 450 nm and 710 nm. By the color-separating element of the image processing device 5, the third waveband light L3 within the waveband between 450 nm and 710 nm is separated into a green light and a red light. The green light, the red light and the second waveband light L2 (i.e. the blue light) are projected as an image in a color separation or time division manner.

Moreover, since the green light is more sensitive to the human eyes than the red light, the phosphor device 40 of the illumination system 4 may be modified to have plural sections. Moreover, the additional use of the filter may adjust the luminance and brightness of the green light or the red light.

FIG. 6B is another exemplary phosphor device used in the projection apparatus of FIG. 5A or FIG. 5B. FIG. 6C is a further exemplary phosphor device used in the projection apparatus of FIG. 5A or FIG. 5B. Please refer to FIGS. 5A, 6B and 6C. In this embodiment, the phosphor device 40 comprises a first section 401 containing a first phosphor agent 402 and a second section 404 containing a second phosphor agent 405. The first phosphor agent 402 is coated on the first section 401. The second phosphor agent 405 is coated on the second section 404. In some embodiments, the first phosphor agent 402 and the second phosphor agent 405 are green phosphor agents, but are not limited thereto. In addition, the compositions of the first phosphor agent 402 and the second phosphor agent 405 may be identical or different. In a case that the compositions of the first phosphor agent 402 and the second phosphor agent 405 are identical, the first waveband light L1 within the blue waveband is converted into the third waveband light L3, which covers a green waveband and a red waveband. In a case that the compositions of the first phosphor agent 402 and the second phosphor agent 405 are similar or different, the first waveband light L1 within the blue waveband is converted into two kinds of third waveband lights L3 (not shown). The two kinds of third waveband lights L3 are time-sequentially directed to the rear end of the illumination system 4.

In some other embodiments, the phosphor device 40 further comprises a first color filter 403 and a second color filter 406. The first color filter 403 and the second color filter 406 are located at the side of the phosphor device 40 for outputting the third waveband light L3. In addition, the first color filter 403 and the second color filter 406 are located adjacent to the first section 401 and the second section 404, respectively. The first color filter 403 is used for filtering a first light of the third waveband light L3. Consequently, a second light of the third waveband light L3 is transmitted through the first color filter 403 and directed to the optical path. The second color filter 406 is used for filtering the second light of the third waveband light L3. Consequently, the first light of the third waveband light L3 is transmitted through the second color filter 406 and directed to the optical path.

For example, if the third waveband light L3 is a yellow-green light within a green waveband and a red waveband, the first light is a green light and the second light is a red light. The first color filter 403 is used for filtering the green light, so that the red light is transmitted through the first color filter 403 and directed to the optical path. Moreover, the second color filter 406 is used for filtering the red light, so that the green light is transmitted through the second color filter 406 and directed to the optical path. In other words, the first color filter 403 is a red filter, and the second color filter 406 is a green filter, but is not limited thereto. Moreover, in some embodiments, the first color filter 403 and the second color filter 406 may be exchanged in order to change the optical properties (e.g. the luminance or brightness) of the first light or the second light outputted from the phosphor device 40. Alternatively, in some other embodiments, the second section 404 is a transparent region, a light-transmissible region or a reflective region without any phosphor agent.

Figure 7A:
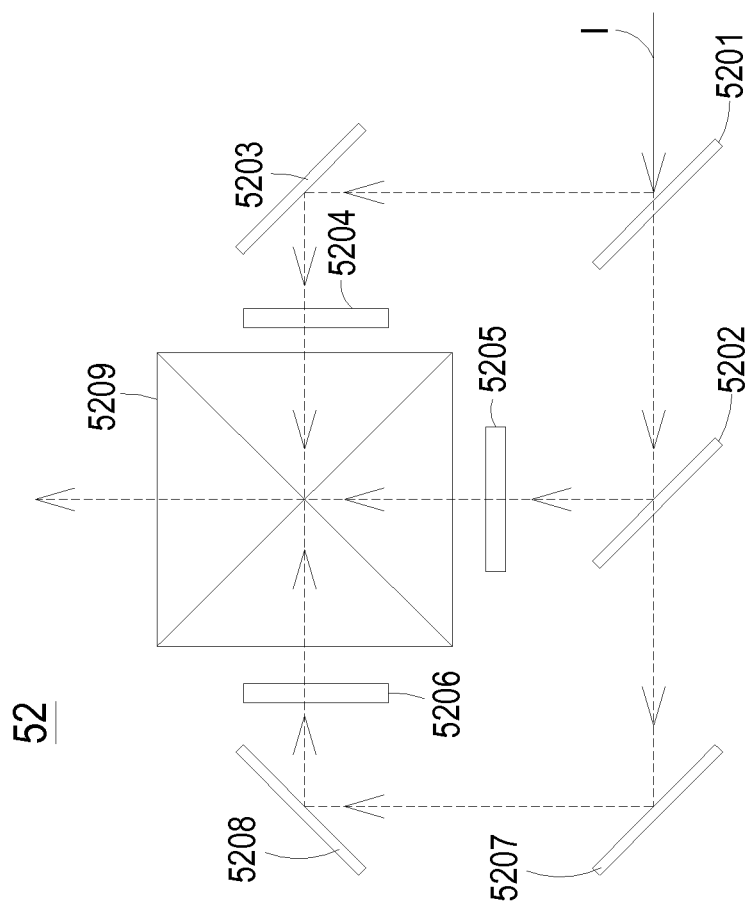
FIG. 7A schematically illustrates an exemplary imaging module used in the projection apparatus of the present invention.

FIG. 7A schematically illustrates an exemplary imaging module used in the projection apparatus of the present invention. Please refer to FIGS. 5A and 7A. In this embodiment, the imaging module 52 of the image processing device 5 is applied to a three-chip LCD projector. The imaging module 52 is used for receiving the second waveband light and the third waveband light (i.e. the incident ray I) from the relay module 51. By the color-separating elements (e.g. dichroic filters) of the imaging module 52, the color lights contained in the incident ray I are separated. In an embodiment, a first dichroic filter 5201 and a second dichroic filter 5202 are employed to separate the three primary color lights. The green light and the red light are permitted to be transmitted through the first dichroic filter 5201, but the blue light is reflected by the first dichroic filter 5201. The red light is permitted to be transmitted through the second dichroic filter 5202, but the green light is reflected by the second dichroic filter 5202. The blue light fraction of the incident ray I is reflected by the first dichroic filter 5201, reflected by the first reflective mirror 5203, and projected on a first liquid crystal display unit 5204. The green light fraction of the incident ray I is transmitted through the first dichroic filter 5201, reflected by the second dichroic filter 5202, and projected on a second liquid crystal display unit 5205. The red light fraction of the incident ray I is transmitted through the first dichroic filter 5201 and the second dichroic filter 5202, reflected by a second reflective mirror 5207 and a third reflective mirror 5208, and projected on a third liquid crystal display unit 5206. Afterwards, the image is projected out from a cross dichroic prim (X-Cube) 5209 to the lens group 6 along the rear-ended optical path.

Figure 7B:
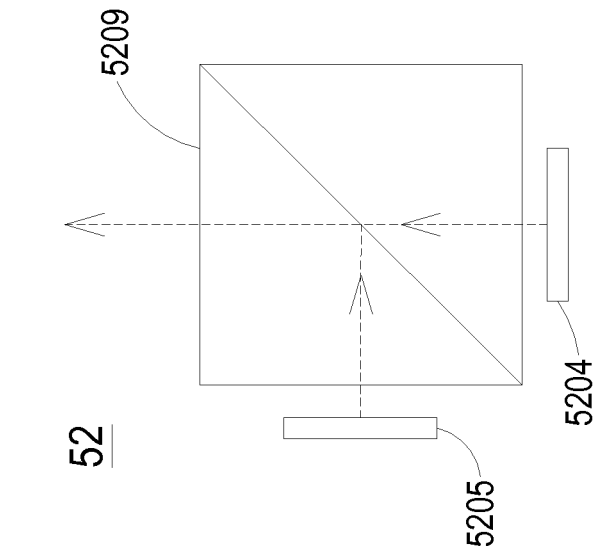
FIG. 7B schematically illustrates another exemplary imaging module used in the projection apparatus of the present invention.

FIG. 7B schematically illustrates another exemplary imaging module used in the projection apparatus of the present invention. In this embodiment, the imaging module 52 of the image processing device 5 is applied to a two-chip LCD projector. The imaging module 52 also comprises a first liquid crystal display unit 5204, a second liquid crystal display unit 5205, and cross dichroic prim 5209. The processes of propagating the incident ray and the blue light fraction are similar to those of FIG. 7A, and are not redundantly described herein. In this embodiment, the phosphor device with plural sections is employed, and thus plural third waveband lights may be time-sequentially directed to the imaging module 52. That is, the green light fraction and the red light fraction of the incident ray are both received by the second liquid crystal display unit 5205, and the green light and the red light are time-sequentially projected on the cross dichroic prim 5209 in a time division manner. The images outputted from the first liquid crystal display unit 5204 and the second liquid crystal display unit 5205 are combined together by the cross dichroic prim 5209, and the combined image is directed to the rear-ended optical path.

Figure 8B:
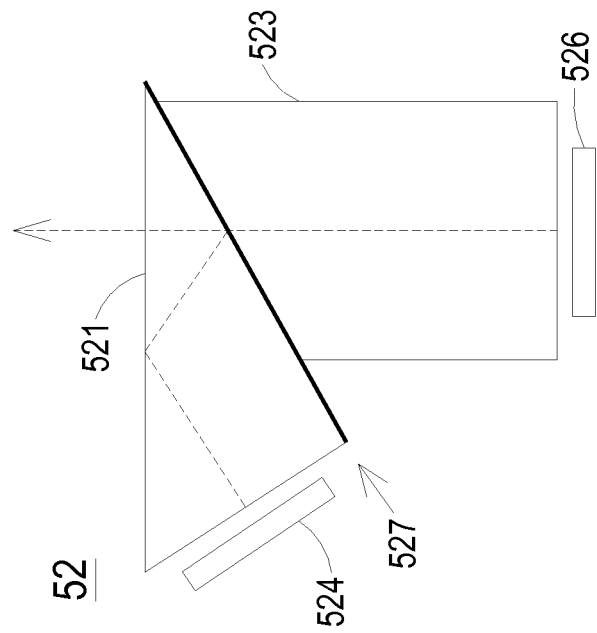
FIG. 8B schematically illustrates another exemplary imaging module used in the projection apparatus of the present invention.
Figure 8A:
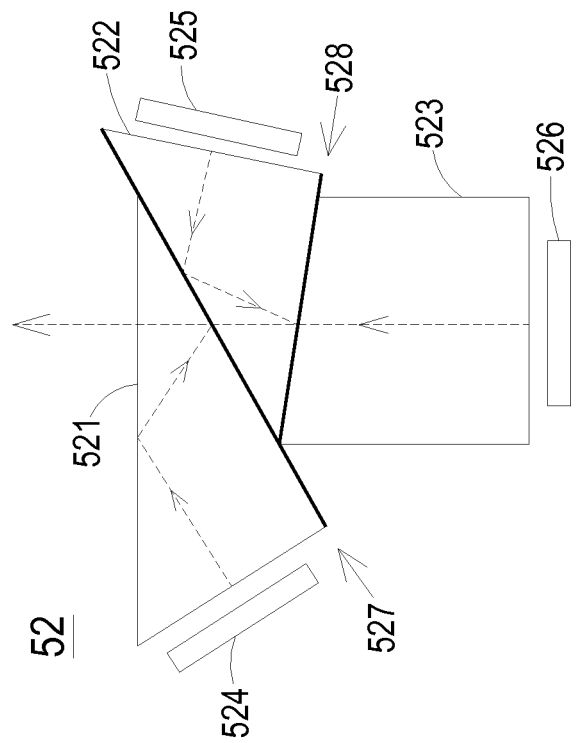
FIG. 8A schematically illustrates another exemplary imaging module used in the projection apparatus of the present invention.

FIG. 8A schematically illustrates another exemplary imaging module used in the projection apparatus of the present invention. Please refer to FIGS. 5A and 8A. In this embodiment, the imaging module 52 of the image processing device 5 is applied to a three-chip digital light processing (DLP) projector. The imaging module 52 comprises a first prism 521, a second prism 522, and a third prism 523. The blue light from a first digital micromirror device 524 may be reflected by a first interface 527 between the first prism 521 and the second prism 522. The red light from a second digital micromirror device 525 may be reflected by a second interface 528 between the second prism 522 and the third prism 523. The blue light and the red light are combined with the green light from a third digital micromirror device 526, so that a resultant image is projected out to the rear-ended optical path.

FIG. 8B schematically illustrates another exemplary imaging module used in the projection apparatus of the present invention. In this embodiment, the imaging module 52 of the image processing device 5 is applied to a two-chip digital light processing (DLP) projector. The imaging module 52 comprises a first prism 521, a third prism 523, a first digital micromirror device 524, and a third digital micromirror device 526. There is an interface 527 between the first prism 521 and the third prism 523. The processes of propagating the incident ray and the blue light fraction are similar to those of FIG. 8A, and are not redundantly described herein. On the other hand, the third digital micromirror device 526 is used for receiving the green light and the red light. The green light and the red light are time-sequentially reflected to the third prism 523. The green light and the red light are combined with the blue light from the first digital micromirror device 524, so that a resultant image is projected out to the rear-ended optical path.

From the above descriptions, the present invention provides an illumination system and a projection apparatus with a single phosphor device. A first waveband light is converted into a third waveband light by the phosphor agent of the phosphor device. Then, the third waveband light is separated into at least two color lights. In such way, only a single phosphor device is required, and the number of the solid-state light-emitting elements is reduced. Consequently, the overall volume of the illuminating system or the projection apparatus is reduced, the fabricating process is simplified, and the fabricating cost is reduced. Moreover, by using the illuminating system, the color purity and the imaging quality are enhanced. Moreover, since the first waveband light is converted into the third waveband light with the wider waveband by the phosphor device, as the driving current of the blue solid-state light-emitting element increases, the possibility of attenuating the red light will be reduced. Consequently, the overall luminance and brightness will be increased, and the color performance is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A phosphor device of an illumination system, said illumination system emitting a first waveband light and having an optical path, said phosphor device comprising:
   a first section;
   a second section; and
   one single phosphor agent coated on said first section, wherein after said first waveband light is emitted to said first section and received by said one single phosphor agent, said first waveband light is converted into a third waveband light and said third waveband light is directed to said optical path, and after said first waveband light is transmitted through said second section, said first waveband light is directed to said optical path and said first waveband light and said third waveband light are integrated as an effective white light along said optical path so as to be projected.

2. The phosphor device according to claim 1, wherein a portion of said first waveband light from said illumination system is partially transmitted through said second section and directed to an image processing device along said optical path.

3. The phosphor device according to claim 2, wherein another portion of said first waveband light from said illumination system is received by said one single phosphor agent and converted into said third waveband light, wherein said third waveband light is directed to said image processing device along said optical path.

4. The phosphor device according to claim 3, wherein said effective white light is separated into three primary color lights by said image processing device in a color separation or time division manner.

5. The phosphor device according to claim 1, wherein said second section is a transparent section.

6. The phosphor device according to claim 5, wherein a central angle of said transparent section is smaller than a central angle of said first section.

7. The phosphor device according to claim 1, wherein said third waveband light has a wavelength in a range between 450 nm and 710 nm.

8. The phosphor device according to claim 1, wherein an incident direction of said first waveband light is identical to or reverse to an emergence direction of said third waveband light with respect to said phosphor device.

9. An illumination system, comprising:
   a dichroic element;
   a phosphor device comprising a first section and one single phosphor agent coated on said first section;
   a first solid-state light-emitting element located at a first side of said dichroic element for emitting a first waveband light to said phosphor device, wherein said first waveband light is converted into a third waveband light by said phosphor device; and
   a second solid-state light-emitting element for emitting a second waveband light to said dichroic element,
   wherein when said phosphor device is located at said first side of said dichroic element and said second solid-state light-emitting element is located at a second side of said dichroic element, an incident direction of said first waveband light is identical to an emergence direction of said third waveband light with respect to said phosphor device, or when said second solid-state light-emitting element is located at said first side of said dichroic element and said phosphor device is located at said second side of said dichroic element, said incident direction of said first waveband light is reverse to said emergence direction of said third waveband light with respect to said phosphor device, and wherein said second waveband light and said third waveband light are directed to an optical path, and said second waveband light and said third waveband light are integrated as an effective white light along said optical path so as to be projected.

10. The illumination system according to claim 9, wherein when said phosphor device is located at said first side of said dichroic element, said phosphor device is arranged between said first solid-state light-emitting element and said dichroic element.

11. The illumination system according to claim 9, wherein said second waveband light and said third waveband light are directed to an image processing device along said optical path.

12. The illumination system according to claim 11, wherein said effective white light is separated into three primary color lights by said image processing device in a color separation or time division manner.

13. The illumination system according to claim 9, wherein when said phosphor device is located at said second side of said dichroic element, said first waveband light is transmitted through said dichroic element and directed to said phosphor device.

14. The illumination system according to claim 13, wherein said second waveband light is transmitted through said dichroic element, and said third waveband light is reflected by said dichroic element, then said second waveband light and said third waveband light are directed to an image processing device along said optical path.

15. A projection apparatus, comprising:
   an illumination system comprising:
      a dichroic element;
      a phosphor device comprising a first section and one single phosphor agent coated on said first section;
      a first solid-state light-emitting element located at a first side of said dichroic element for emitting a first waveband light to said phosphor device, wherein said first waveband light is converted into a third waveband light by said phosphor device; and
      a second solid-state light-emitting element for emitting a second waveband light to said dichroic element, wherein said second waveband light and said third waveband light are directed to an optical path, and said second waveband light and said third waveband light are integrated as an effective white light along said optical path;
   an image processing device arranged along said optical path for receiving said effective white light, wherein said effective white light is separated into three primary color lights by said image processing device so as to be projected as an image in a color separation or time division manner; and
   a lens group arranged along said optical path for scaling and focusing said image.

16. The projection apparatus according to claim 15, wherein said lens groups comprises at least one lens.

17. The projection apparatus according to claim 15, wherein after being scaled up or scaled down, and focused by said lens group, said image is projected on a display screen.

18. The projection apparatus according to claim 15, wherein said third waveband light has a wavelength in a range between 450 nm and 710 nm.

19. The projection apparatus according to claim 15, wherein said illumination system is a transmissive illumination system or a reflective illumination system.

20. The projection apparatus according to claim 15, wherein said image processing device comprises a relay module and an imaging module, and said relay module is located upstream of said imaging module, and wherein said projection apparatus is a three-chip DLP projector, a two-chip DLP projector, a three-chip LCD projector or a two-chip LCD projector.

* * * * *